(12) United States Patent
Cote (10) Patent No.: US 9,265,237 B2
(45) Date of Patent: Feb. 23, 2016

(54) BIRD FEEDER WITH MOVEABLE SHIELD

(71) Applicant: Brome Bird Care Inc., Knowlton (CA)

(72) Inventor: Paul L. Cote, Lac Brome, CA (US)

(73) Assignee: Brome Bird Care Inc., Knowlton, Quebec (CA)

( * ) Notice: Subject to any disclaimer, the term of this patent is extended or adjusted under 35 U.S.C. 154(b) by 106 days.

(21) Appl. No.: 14/120,484

(22) Filed: May 23, 2014

(65) Prior Publication Data

US 2015/0334995 A1   Nov. 26, 2015

(51) Int. Cl.
*A01K 39/00* (2006.01)
*A01K 39/012* (2006.01)
*A01K 39/014* (2006.01)
*A01K 39/01* (2006.01)

(52) U.S. Cl.
CPC ............. *A01K 39/012* (2013.01); *A01K 39/014* (2013.01); *A01K 39/0113* (2013.01)

(58) Field of Classification Search
CPC ... A01K 39/00; A01K 39/01; A01K 39/0113; A01K 39/012
See application file for complete search history.

(56) References Cited

U.S. PATENT DOCUMENTS

| 6,269,769 B1* | 8/2001 | Wenstrand ........... A01K 39/012 119/53 |
| 2007/0163505 A1* | 7/2007 | Lynch .................. A01K 39/012 119/52.1 |
| 2014/0261200 A1* | 9/2014 | Tu .......................... A01K 39/01 119/57.8 |

* cited by examiner

*Primary Examiner* — Monica Williams
*Assistant Examiner* — Aaron Rodziwicz
(74) *Attorney, Agent, or Firm* — Eric Fincham (57) ABSTRACT

A bird feeder which comprises a seed container, a cover, a seed tray below the seed container to receive seeds therefrom, and a shield which is secured to the seed container, the shield being spaced above said seed tray a distance sized to restrict access of certain sized birds to the seed tray.

10 Claims, 8 Drawing Sheets

BIRD FEEDER WITH MOVEABLE SHIELD

FIELD OF THE INVENTION

The present invention relates to bird feeders and more particularly, relates to bird feeders with the ability to deter certain size birds from feeding thereat.

BACKGROUND OF THE INVENTION

The practise of feeding birds, particularly during winter months, is well established and practised in many different countries. Typically, bird feeders are utilized to entice birds to feed thereat. Many people enjoy the sight of birds feeding and try to attract different types of birds. Some birds, particularly song birds, are considered very desirable.

However, there are certain other birds, typically some of the larger birds, which are not considered desirable. These birds will typically consume a lot of feed and many are not considered attractive. Typical of such birds would be pigeons, starlings, grackles, etc. However, the problem of excluding such birds remains.

SUMMARY OF THE INVENTION

It is an object of the present invention to provide a bird feeder which has a member to control the size of birds which can feed thereat.

According to one aspect of the present invention, there is provided a bird feeder comprising a seed container, a cover for the seed container, a seed tray below the seed container to receive seeds therefrom, and a shield secured to the seed container, the shield being spaced above the seed tray a distance sized to restrict access of certain sized birds to the seed tray.

The seed container may be any suitable. Typically, such seed containers are formed of a plastic material and are usually transparent so as to permit one to see how much seed remains. However, it is within the scope of the present invention to use any suitable seed container. As used herein, the term "seed" will include all types of feed whether they are actually seeds or not.

As is conventional in the art, there is provided a cover for the seed container. In a preferred embodiment of the present invention, the cover is secured to the seed container through the use of outwardly projecting members which engage with a lip on the seed container to lock the cover and seed container together.

Preferably, the cover will include a bail to permit hanging of the bird feeder.

The seed tray is situated below the seed container and is generally sized to be somewhat larger than the seed container so as to permit access thereto.

In the present invention, a shield is provided which limits the distance between the seed tray and the shield. Since the arrangement is one in which the bird has to perch on the seed tray in order to feed, the distance between the seed tray and the shield will determine what size of bird is permitted to use the bird feeder. If one wishes to only feed a certain size of bird, then the shield can be attached at a predetermined location. Alternatively, a moveable shield may be utilized.

The bird feeder of the present invention may use a moveable shield which is secured to the seed container. The moveable shield is spaced from the seed tray and may be secured to the seed container in different positions. The moveable shield has an outwardly extending flange which controls the size of birds which can access the seed tray. As aforementioned, the moveable shield may be secured in a number of different positions thus providing the consumer with the ability to control the size of birds feeding from that particular bird feeder.

The moveable shield may come in different sizes depending upon the results desired.

In one preferred embodiment, the moveable shield is secured by means of a retaining pin which enters apertures/recesses in the moveable shield and seed container. A plurality of apertures/recesses in the seed container will allow the adjustability to be achieved.

BRIEF DESCRIPTION OF THE DRAWINGS

Having thus generally described the invention, reference will be made to the accompanying drawings illustrating an embodiment thereof, in which.

DETAILED DESCRIPTION OF THE INVENTION

Referring to the drawings in greater detail and by reference characters thereto, there is illustrated a bird feeder which is generally designated by reference numeral 10.

Bird feeder 10 includes a feed container generally designated by reference numeral 12 and which has an upper wall section 14, a downwardly and inwardly tapering wall section 16, and a lower wall section 18. Below lower wall section 18, there is provided an arcuate inwardly extending wall section 20. A rim member 19 extends around the top of seed container 12.

A plurality of flexible legs 22 extend downwardly from arcuate wall section 20. Two of the legs are longer than the others and have an enlarged bottom portion 24 which provides an abutment wall 26.

Within upper wall section 14, there are a first set of diagonal apertures 28 and a second set of diagonal apertures 30 on a diametrically opposed side thereof. The use of a diagonal line permits closer spacing of the apertures.

A cover member generally is designated by reference numeral 34. Cover 34 includes a top wall 36 and a downwardly extending side wall 38. Mounted on the inner side of side wall 38 are a plurality (three) tabs 40.

Extending downwardly from the interior side of top wall 36 are downwardly extending tabs 42. A bail 44 is provided. Bail 44 includes a hoop portion 46 for purposes of hanging the bird feeder 10. Bail 44 also includes a downwardly extending leg 48 having an enlarged bottom portion 50 which is arranged to engage with downwardly extending tabs 42 to maintain bail 44 in a desired position.

Bird feeder 10 also includes a base or seed tray 56. Seed tray 56 has an upper side wall 58 and a lower side wall 60. A sloping bottom wall 62 is designed to support the seeds within the seed container 12 and direct the seeds outwardly. Seed tray 56 includes a center structure 64. At the lowest point of sloping bottom wall 62 there are provided drainage apertures 66.

Figure 3:
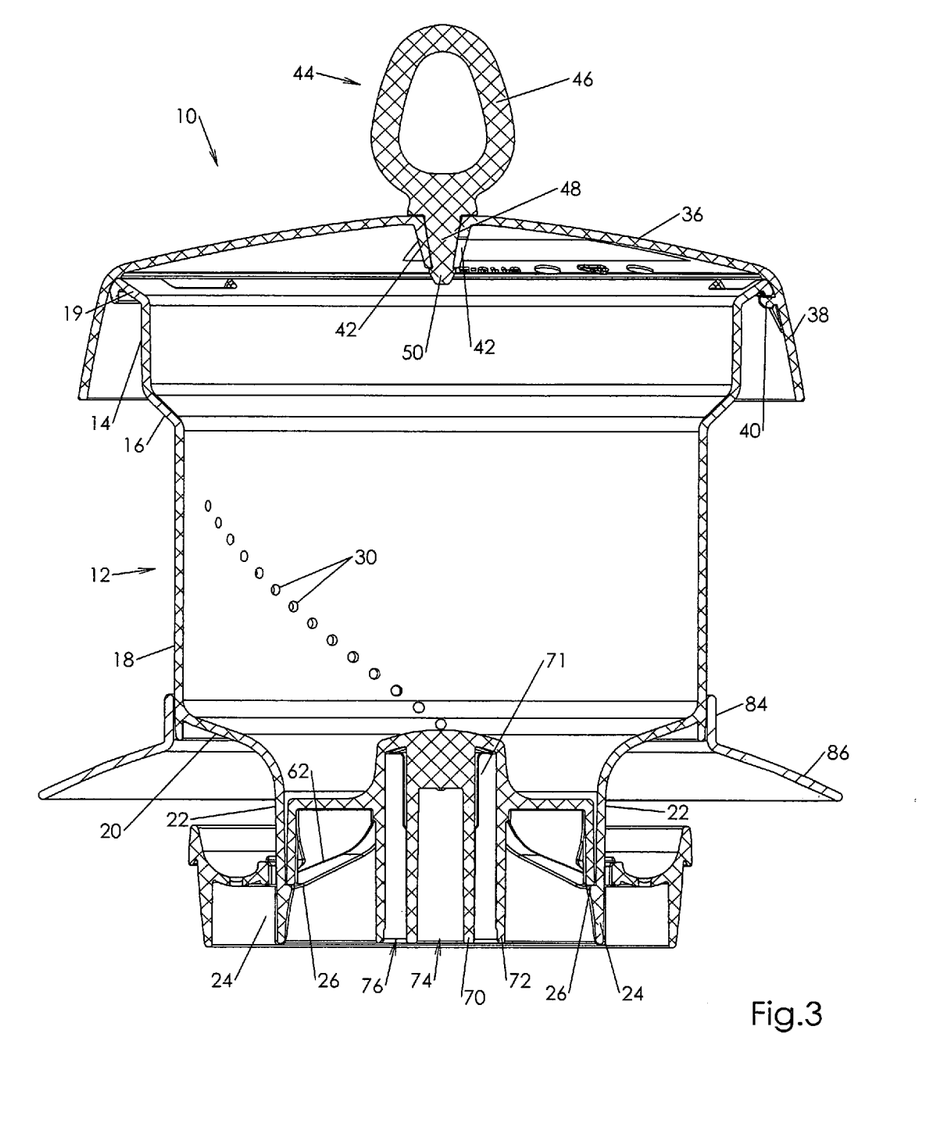
FIG. 3 is a side sectional view thereof.

Also formed in sloping bottom wall 62 are slots 68 which are designed to receive enlarged portions 24 of legs 22 of seed container 12. As may be seen in FIG. 3, the enlarged portions 24 engage with a portion of center structure 64 and seed tray 56.

Seed tray 56 also has an inner post 70 and an outer wall 72. These define a central recess 74 and an outer recess 76 which is capable of receiving poles of two different sizes. Thus, in a first size, the pole will engage the inner surface of wall 72 and in another embodiment, will engage the outer surface of inner post 70. In order to accommodate a third size, one may use an insert 71 to adjust the size.

Figure 1:
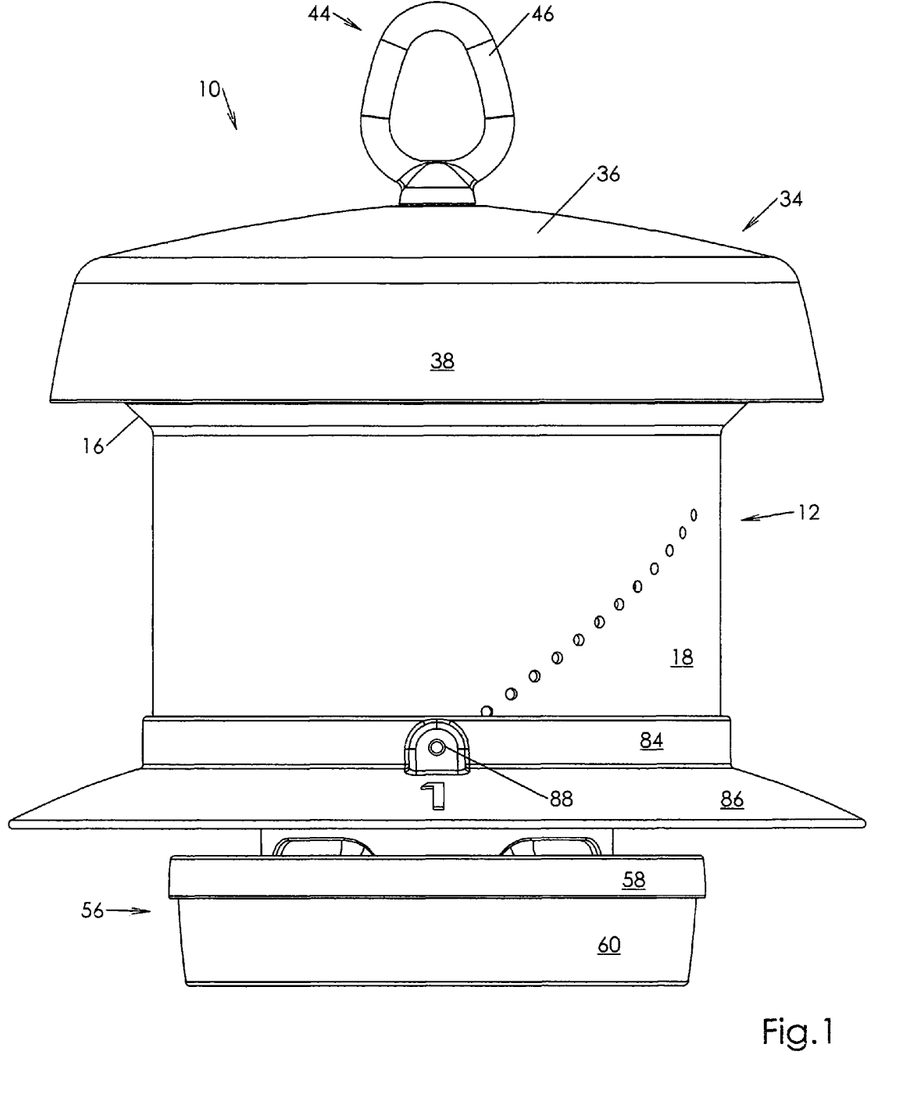
FIG. 1 is a side elevational view of a bird feeder according to the present invention.
Figure 2:
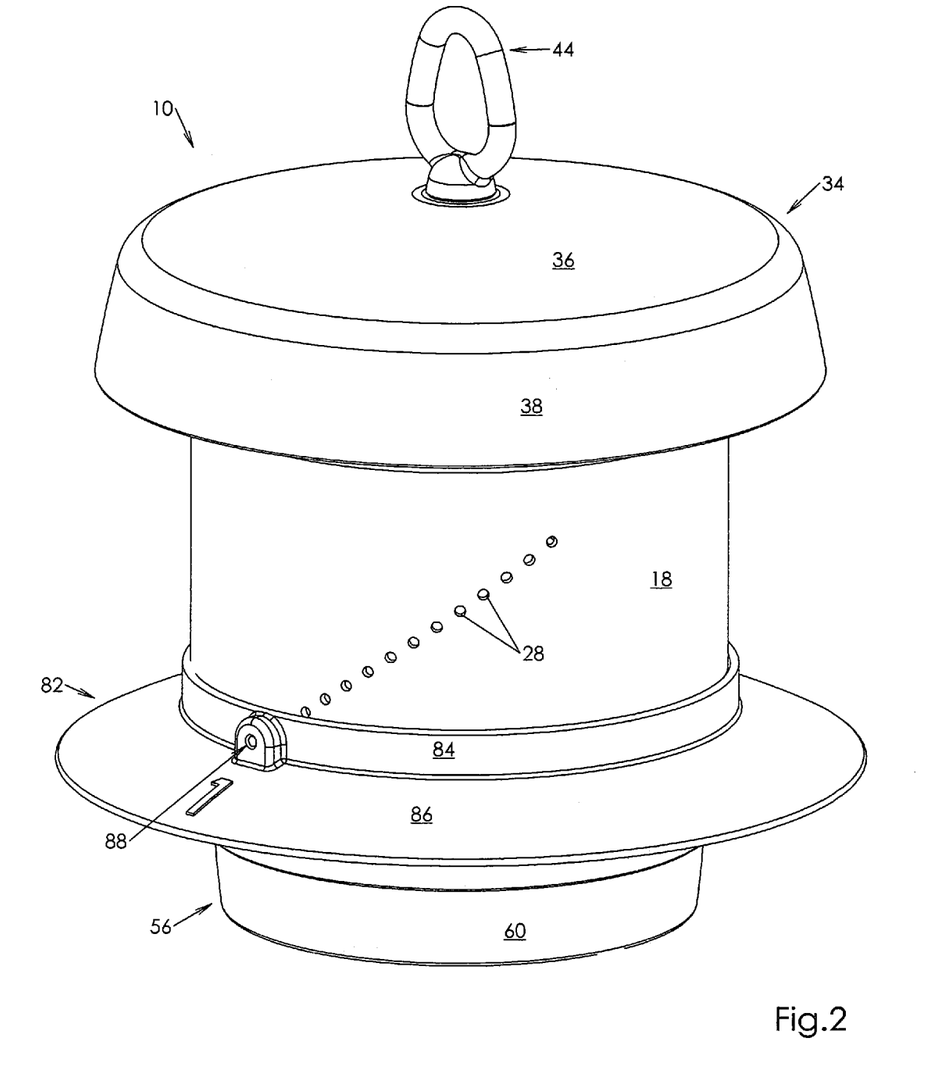
FIG. 2 is a perspective view thereof.
Figure 4:
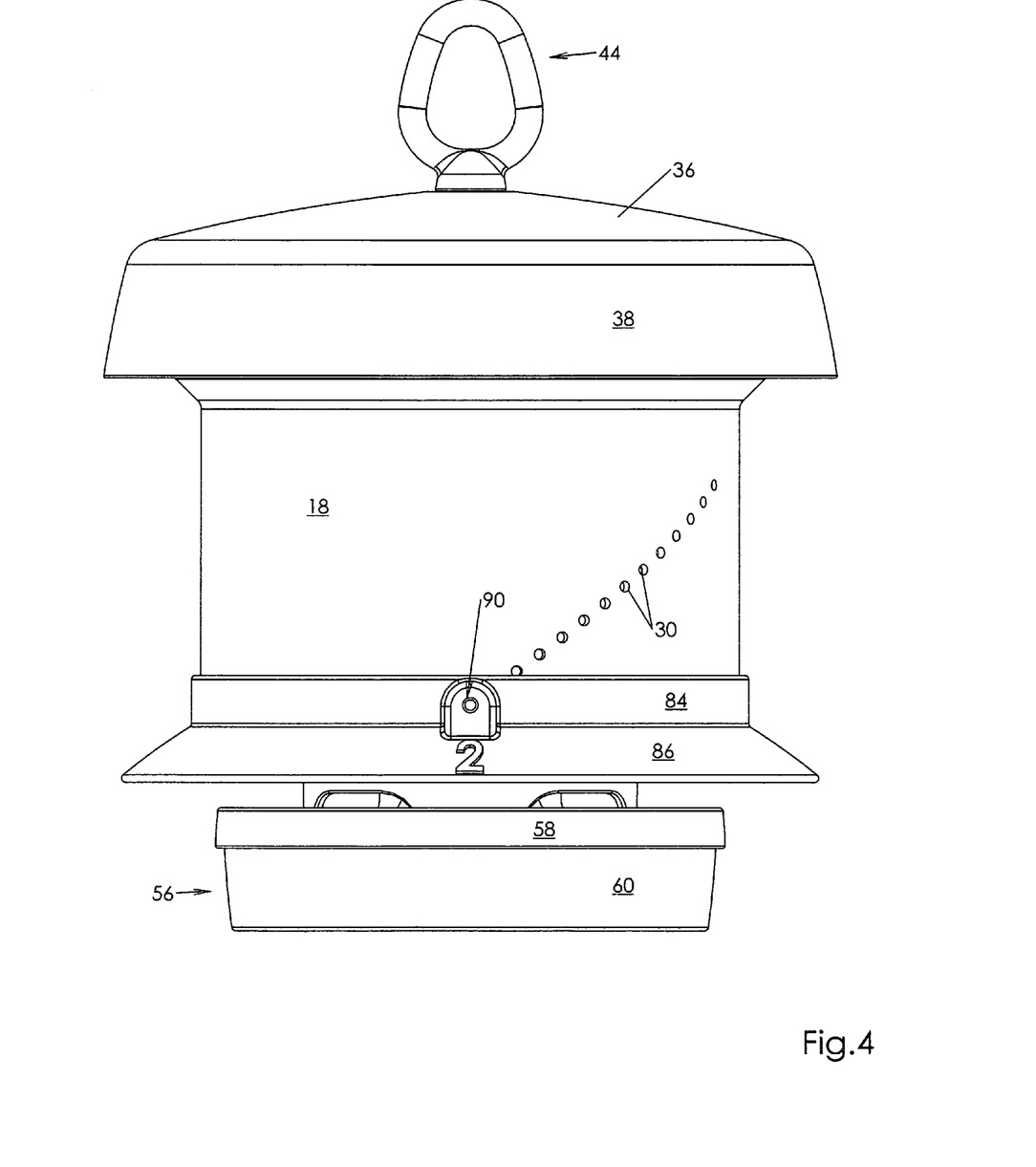
FIG. 4 is a side sectional view from the rear of the bird feeder of FIG. 1.
Figure 5:
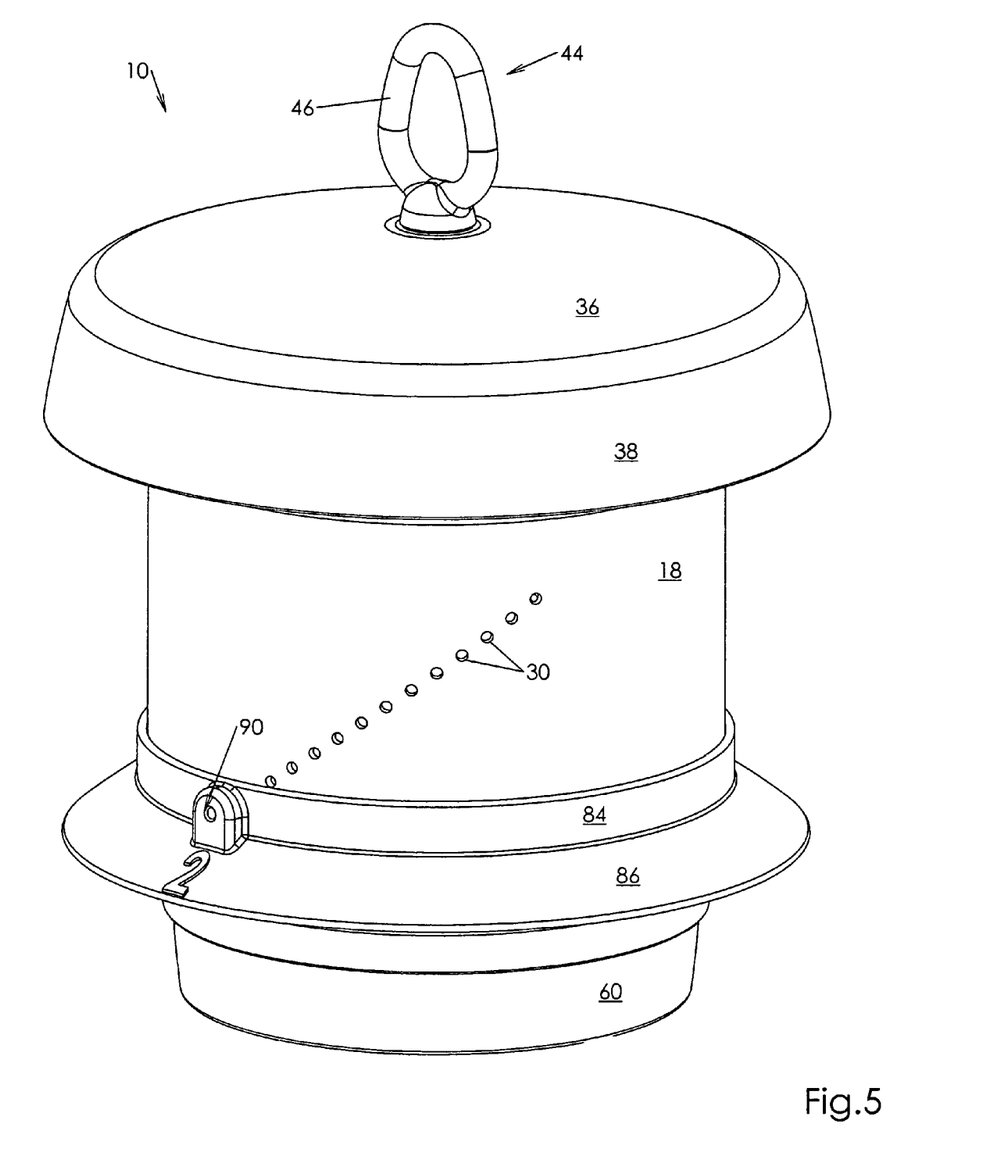
FIG. 5 is a perspective view thereof.
Figure 6:
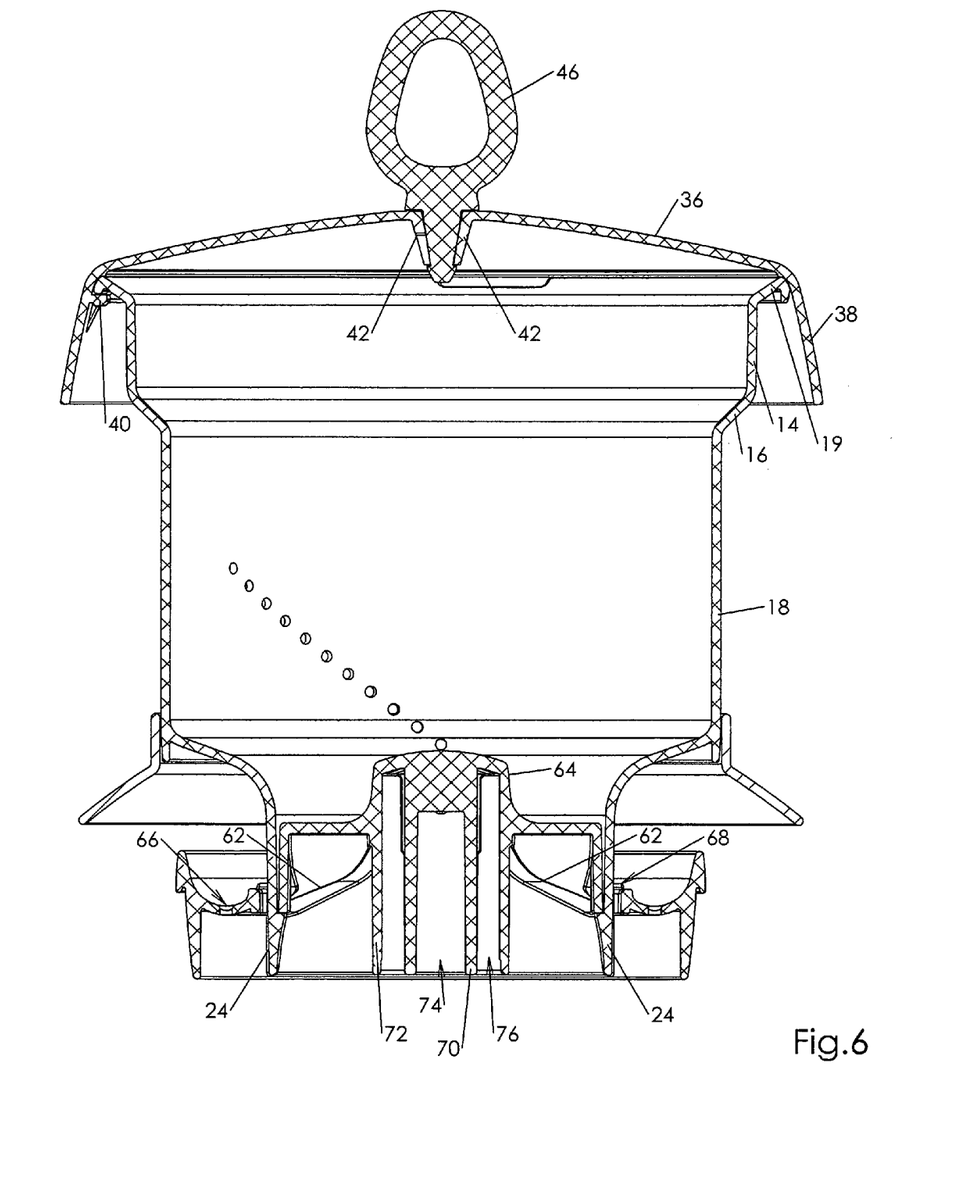
FIG. 6 is a side sectional view of the bird feeder.
Figure 7:
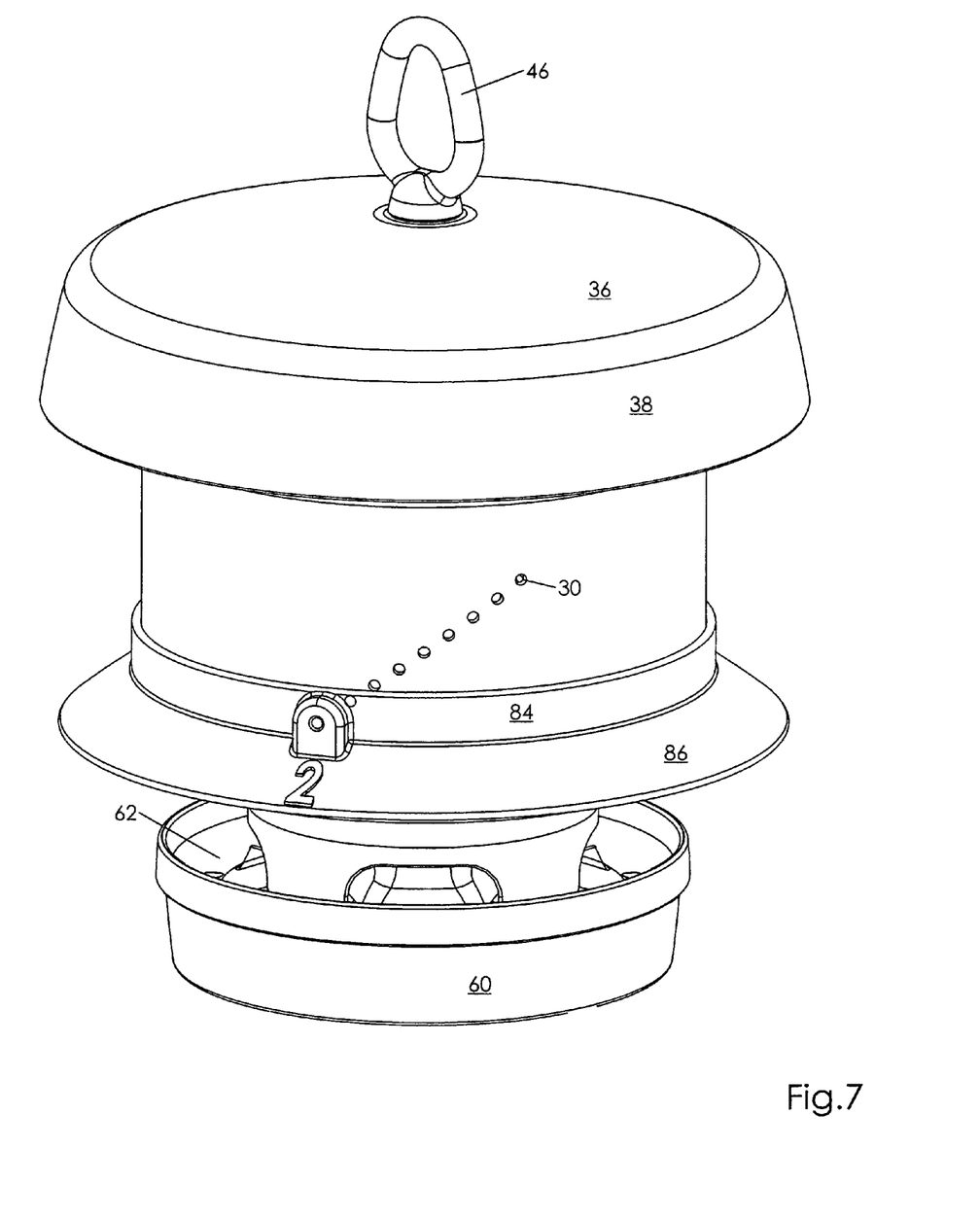
FIG. 7 is a perspective view similar to FIG. 5, but with the moveable shield in a raised position.
Figure 8:
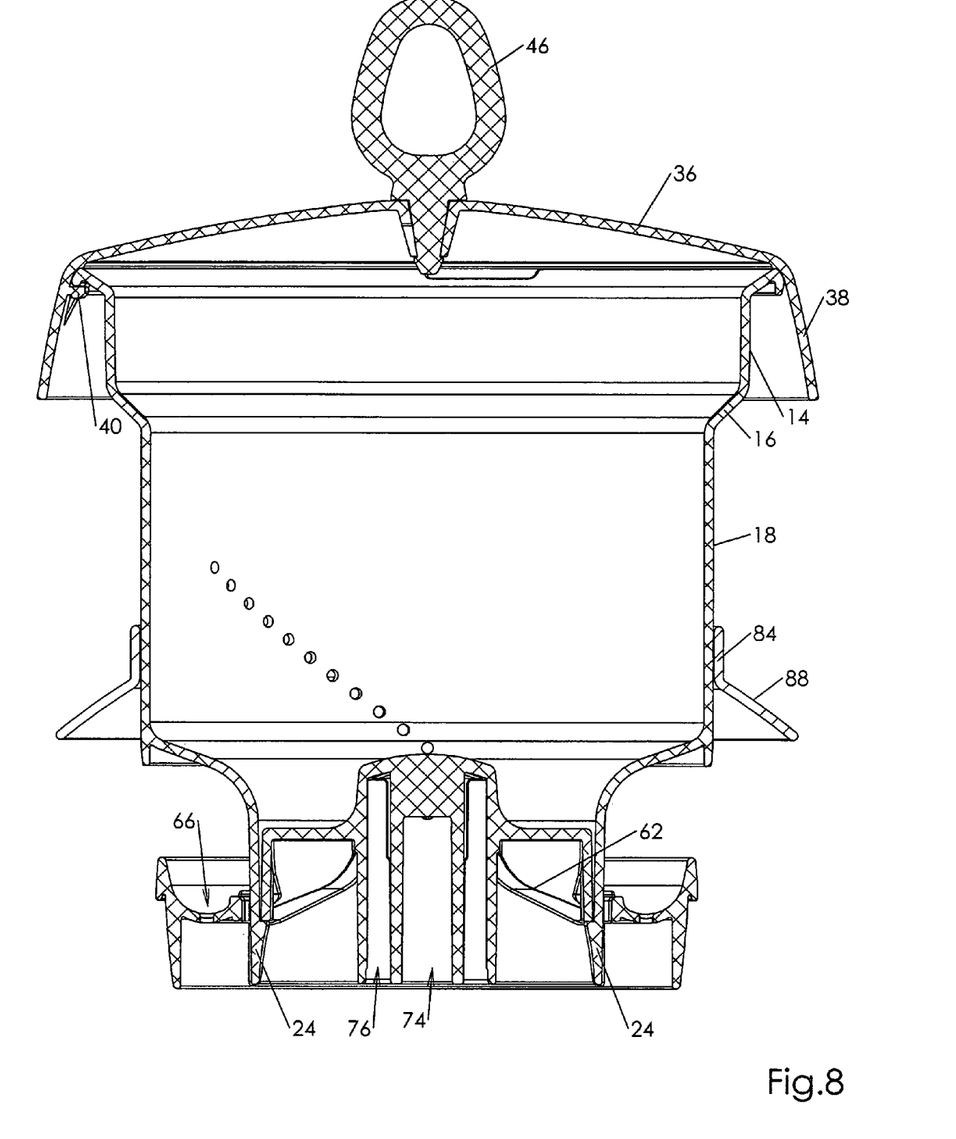
FIG. 8 is a side sectional view thereof.

Seed container 12, at its upper end, has a plurality of recesses formed therein. These recesses are designed to receive tabs 40 of cover 34 such that cover 34 may be placed in position and rotated to engage rim 19 and to engage with seed container 12. Bird feeder 10 also includes a shield 82. Shield 82 has a circular wall portion 84 designed to fit around upper wall section 14 of feed container 12. There is also provided a downwardly and outwardly extending flange portion 86. As may be seen in FIGS. 1 and 4, circular wall 84 may have apertures 88 and 90 formed therein. Apertures 88 and 90 are designed to align with apertures 28, 30 such that a pin may be inserted to lock the shield 82 in a desired position on seed container 12. It will be noted that each line of apertures 28, 30 extend upwardly in a diagonal configuration.

The distance between flange portion 86 and the seed tray will determine how large a bird can utilize the feeder. Thus, the only place for the bird to perch is on the wall of the seed tray and accordingly, only birds of a certain size would be able to access the seed due to flange portion 86.

It will be understood that the above described embodiment is for purposes of illustration only and that changes and modifications may be made thereto without departing from the spirit and scope of the invention.

I claim:

1. A bird feeder comprising: a seed container; a cover for said seed container; a seed tray below said seed container to receive seeds therefrom; a moveable shield secured to said seed container, said moveable shield being securable to said seed container at different heights and being spaced above said seed tray a distance sized to restrict access of certain sized birds to said seed tray; and wherein both said seed container and said moveable shield have corresponding apertures to permit a retaining pin to enter therein to thereby retain said moveable shield in a desired position with respect to said seed container.

2. The bird feeder of claim 1, wherein said moveable shield has a top surface with a convex configuration and a bottom surface with a concave configuration.

3. The bird feeder of claim 1, wherein said apertures extend diagonally along said seed container.

4. The bird feeder of claim 3, wherein there are two rows of apertures.

5. The bird feeder of claim 2, wherein said moveable shield includes a circular portion sitting adjacent said seed container and an outwardly extending flange, said outwardly extending flange preventing birds of a certain size from accessing seed in said seed tray.

6. The bird feeder of claim 2, further including a hanger, said hanger being secured to said cover, said cover being secured to said seed container.

7. The bird feeder of claim 2, wherein said seed tray includes a plurality of concentric recesses to receive different size poles for mounting purposes.

8. The bird feeder of claim 2, further including a plurality of moveable shields, each of said shields having a different size flange.

9. The bird feeder of claim 2, further including a plurality of drainage apertures formed in said seed tray.

10. The bird feeder of claim 8, wherein said container has a plurality of downwardly extending flexible tabs, said tabs being arranged to seat within a slot formed within said seed tray.

* * * * *